United States Patent

[11] 3,597,906

[72] Inventor Albert G. Bodine
 7877 Woodley Ave., Van Nuys, Calif. 91406
[21] Appl. No. 799,424
[22] Filed Feb. 14, 1969
[45] Patented Aug. 10, 1971

[54] THRESHING DEVICE
 11 Claims, 24 Drawing Figs.

[52] U.S. Cl. ........................................... 56/13.3,
 56/126, 209/111.9, 56/14.1, 56/16.6, 56/14.4
[51] Int. Cl. ........................................... A01d 41/08
[50] Field of Search ........................................... 56/19,
 126—130, 328, 330; 74/86, 87; 130/30 A, 30 I, 30
 F; 73/69; 209/1, 2, 111.9, 3; 15/363, 382, 404;
 37/195, 126; 172/40; 55/292, 277

[56] References Cited
UNITED STATES PATENTS

| 3,231,025 | 1/1966 | Bodine | 259/DIG. 44 |
|---|---|---|---|
| 3,307,278 | 3/1967 | Bodine, Jr. | 37/195 |
| 3,428,048 | 2/1969 | Giusti | 130/30 |
| 3,435,950 | 4/1969 | Suverkrop | 209/111.9 X |
| 1,415,568 | 5/1922 | Hryniewich | 74/86 UX |
| 2,037,624 | 4/1936 | Franklin | 56/330 |
| 2,376,260 | 5/1945 | Lobdell | 56/19 |
| 2,623,344 | 12/1952 | Stafford | 56/DIG. 8 |
| 2,718,744 | 9/1955 | Phillips | 56/DIG. 8 |
| 2,858,560 | 11/1958 | Bodine, Jr. | 15/382 |
| 3,030,715 | 4/1962 | Bodine | 37/DIG. 18 |
| 3,033,543 | 5/1962 | Bodine | 37/DIG. 18 |
| 3,053,031 | 9/1962 | Vedder et al. | 55/292 |
| 3,076,545 | 2/1963 | Bodine, Jr. | 209/1 |
| 3,217,551 | 11/1965 | Bodine, Jr. | 74/87 |

FOREIGN PATENTS

| 994,505 | 8/1951 | France | 56/130 |
|---|---|---|---|
| 1,037,310 | 4/1953 | France | 15/363 |
| 1,270,071 | 7/1961 | France | 56/19 |
| 472,665 | 6/1952 | Italy | 56/128 |
| 6,408,562 | 2/1965 | Netherlands | 56/330 |
| 917,706 | 9/1954 | Germany | 56/19 |

Primary Examiner—Louis G. Mancene
Assistant Examiner—J. A. Oliff
Attorney—Sokolski & Wohlgemuth ABSTRACT: A device for utilization in the threshing of crop elements such as grain which effectively removes the seed from the chaff in the field, comprising means for engaging individual grains or heads, subjecting such grains to resonant sonic vibration whereby they are easily separated from the stock and chaff, and means for drawing the separated grains into a hopper or similar storage portion of the machine.

Patented Aug. 10, 1971
3,597,906
9 Sheets-Sheet 1
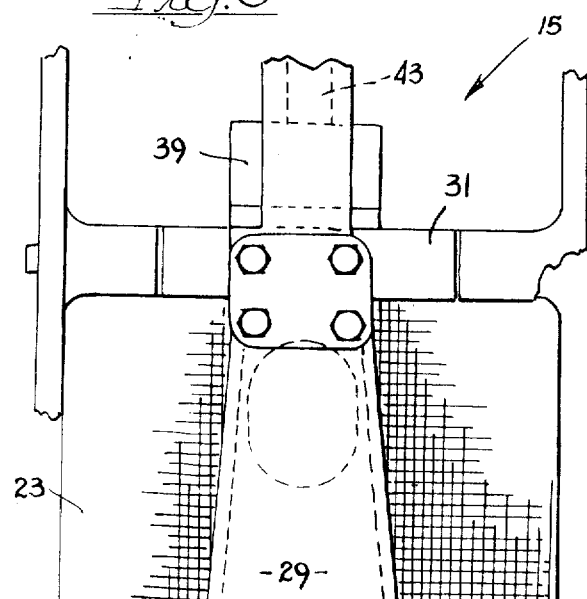
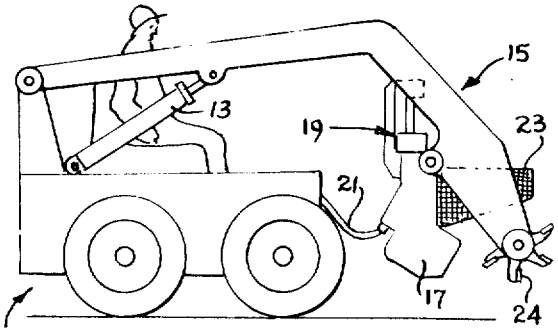
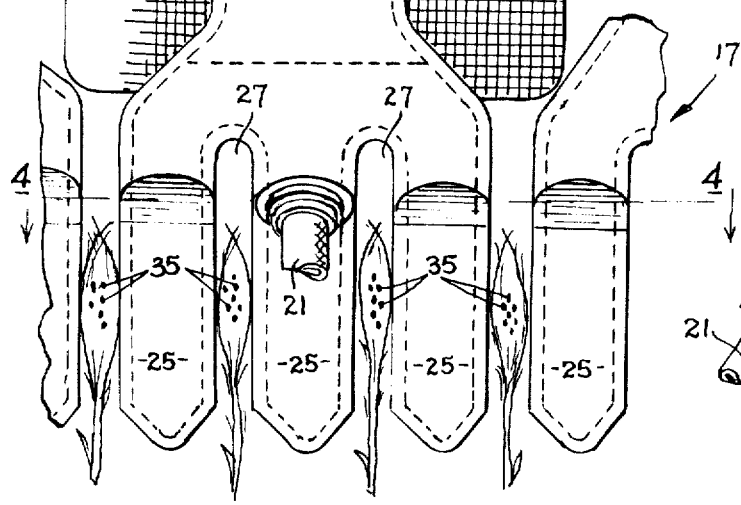
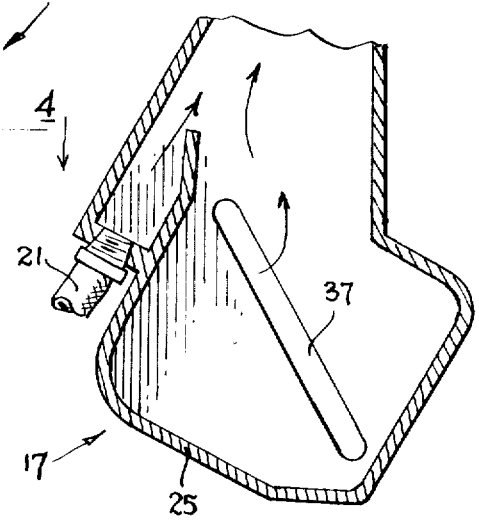
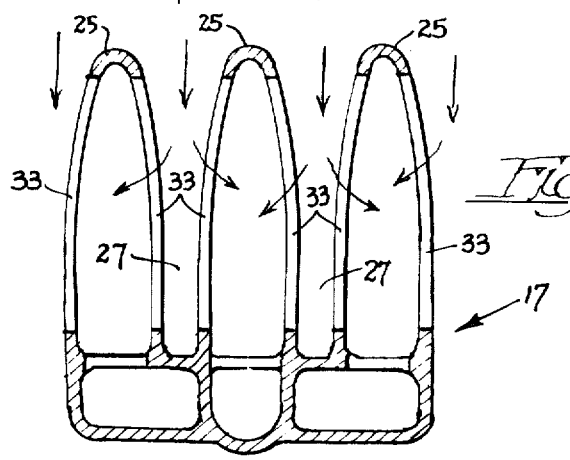
INVENTOR.
Albert G Bodine
BY
Sokolski & Wohlgemuth
Attorneys.

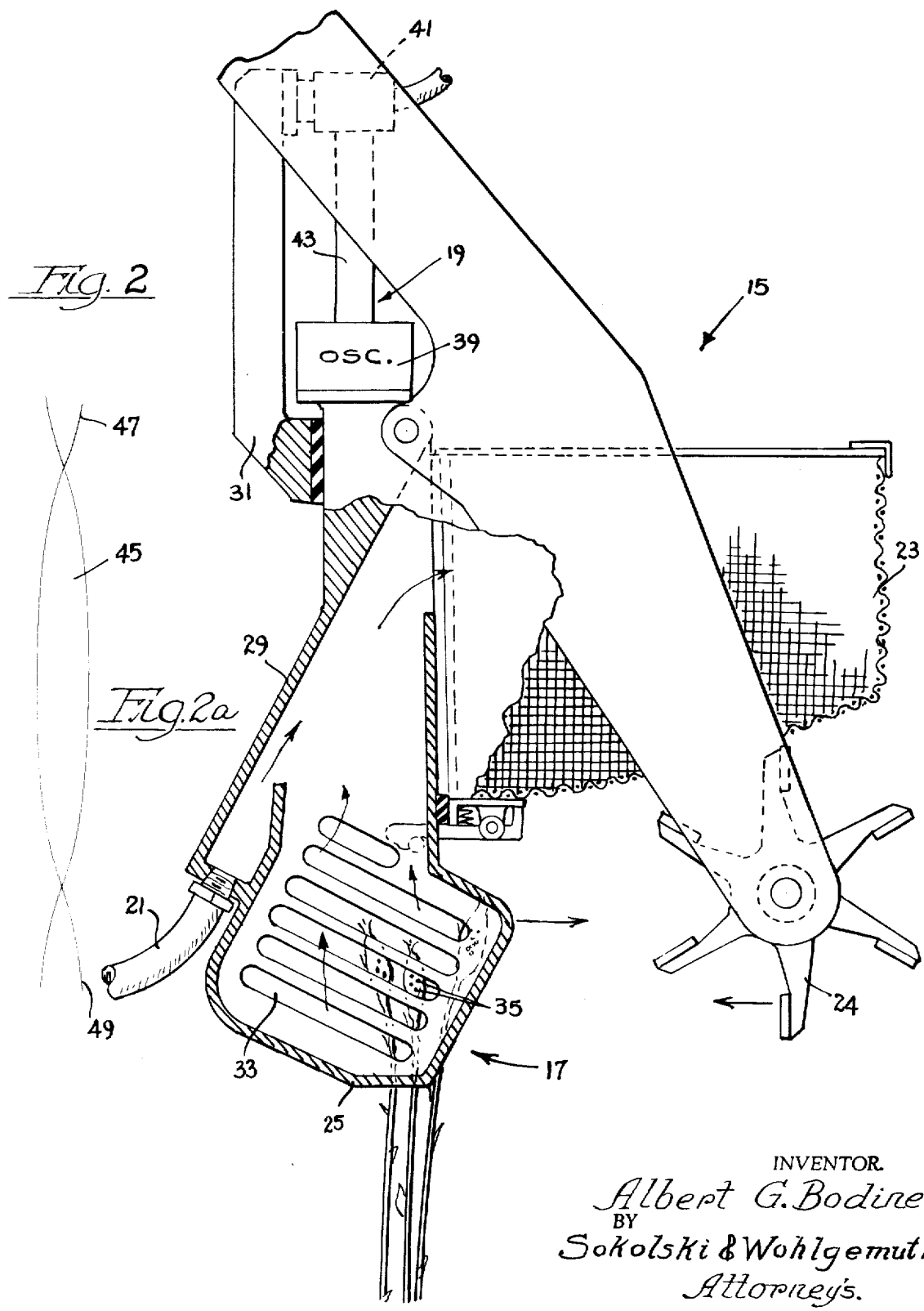

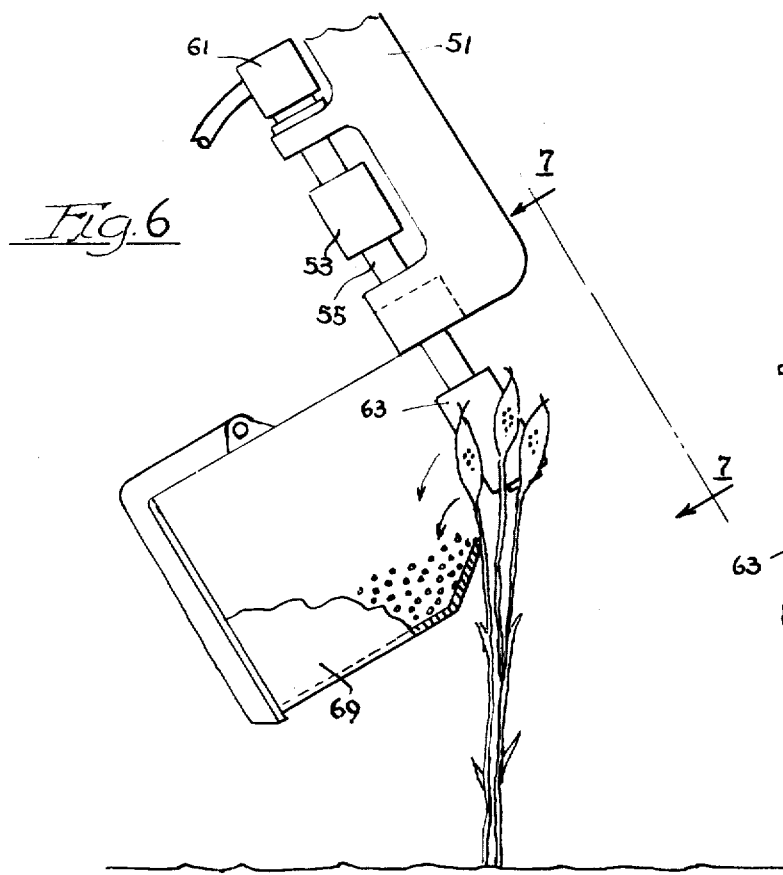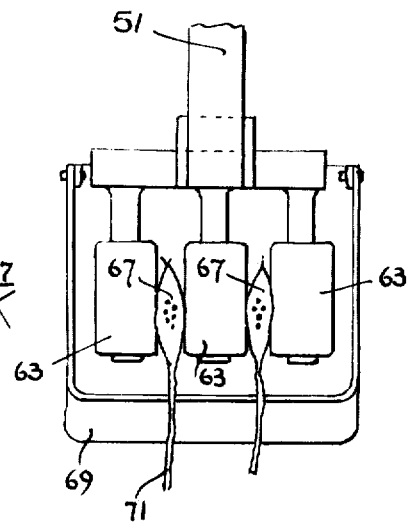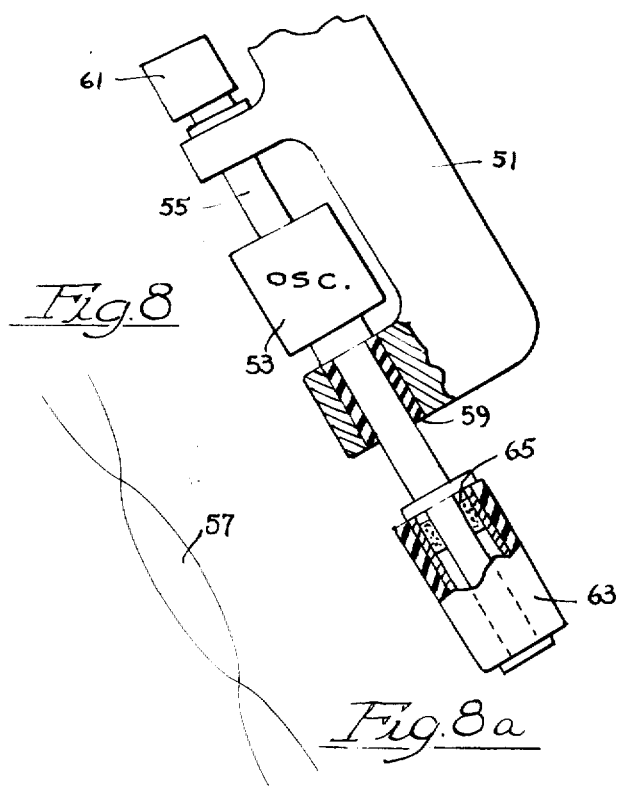

Patented Aug. 10, 1971
3,597,906
9 Sheets-Sheet 4
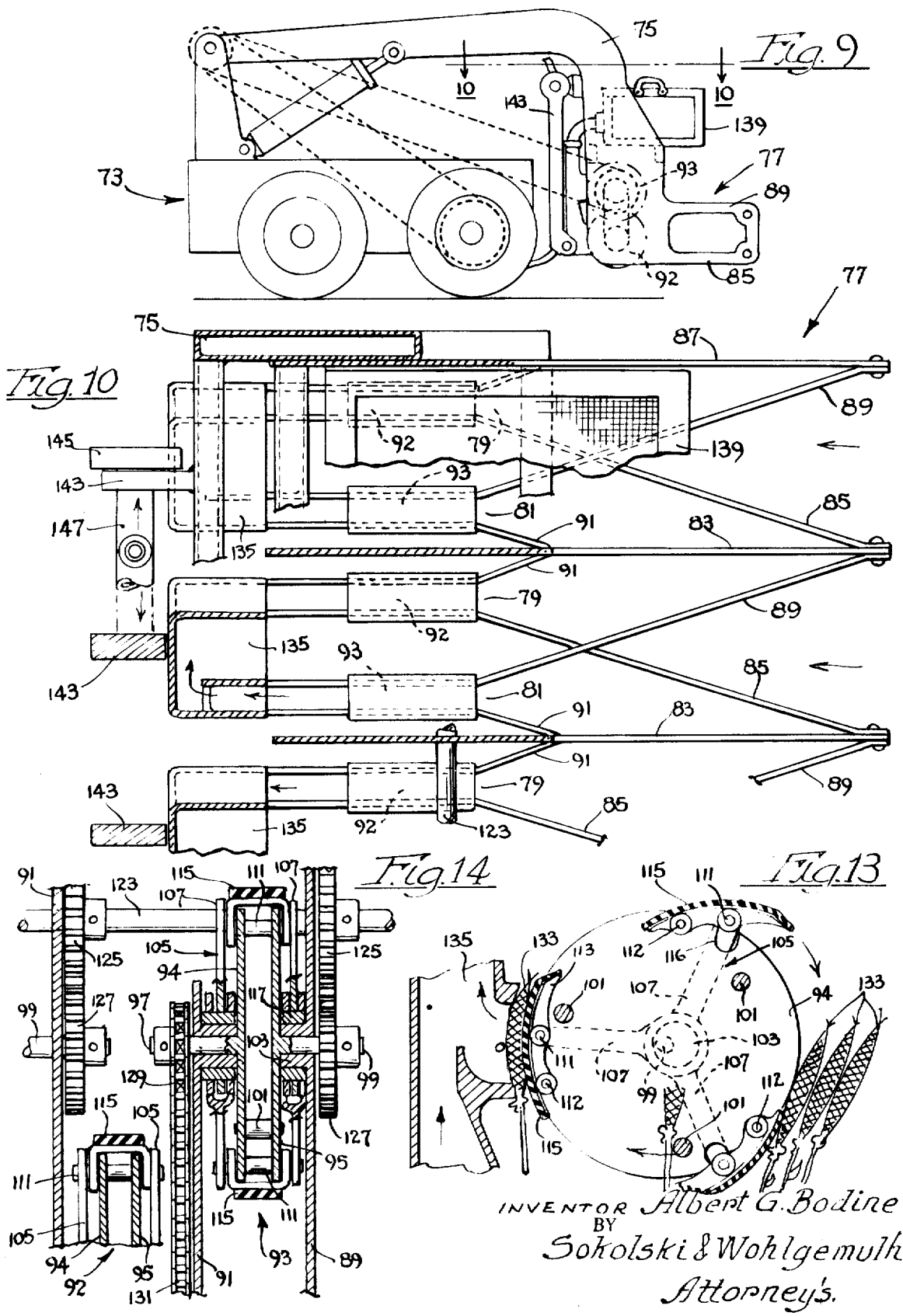
INVENTOR Albert G. Bodine
BY Sokolski & Wohlgemuth
Attorneys.

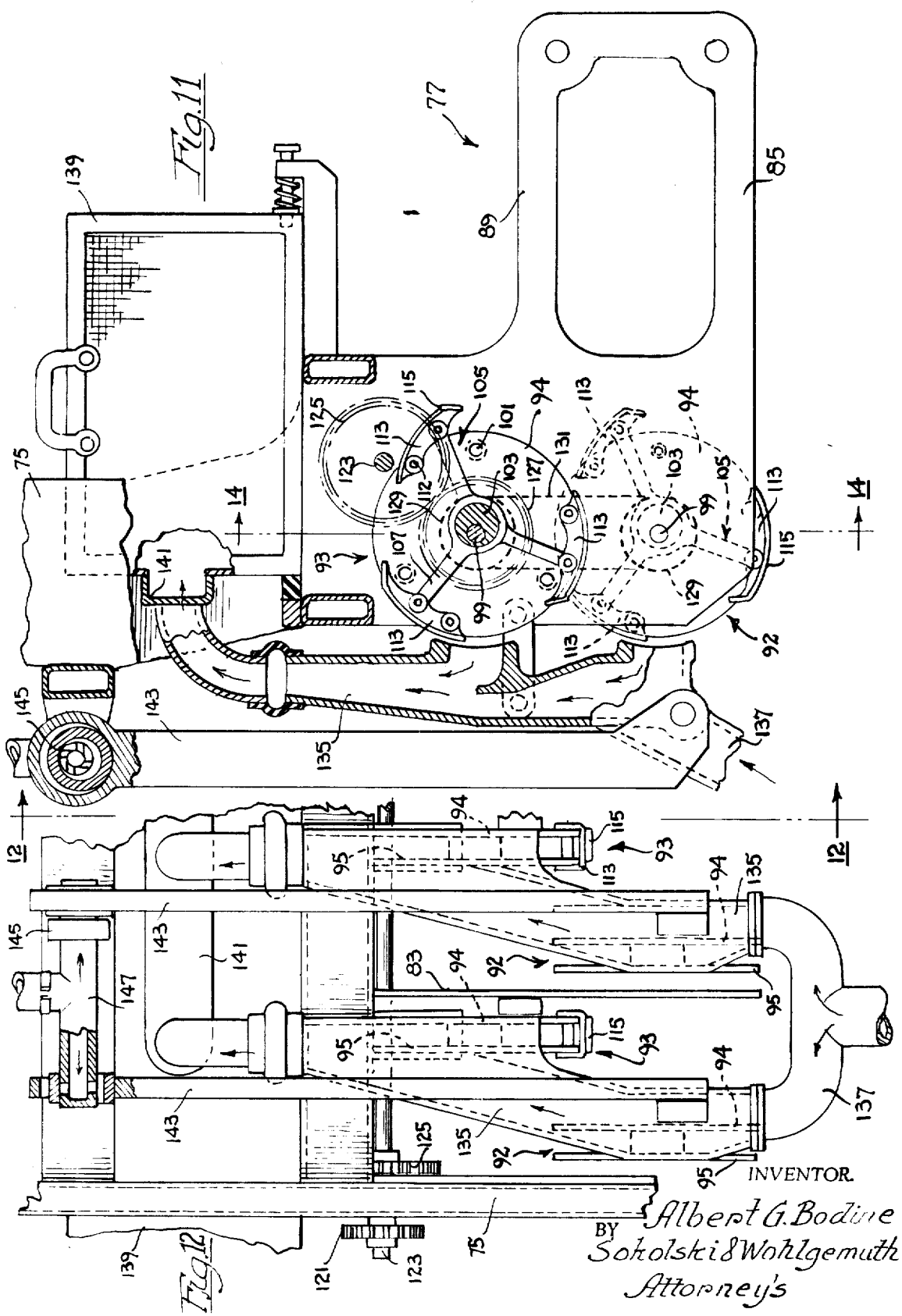

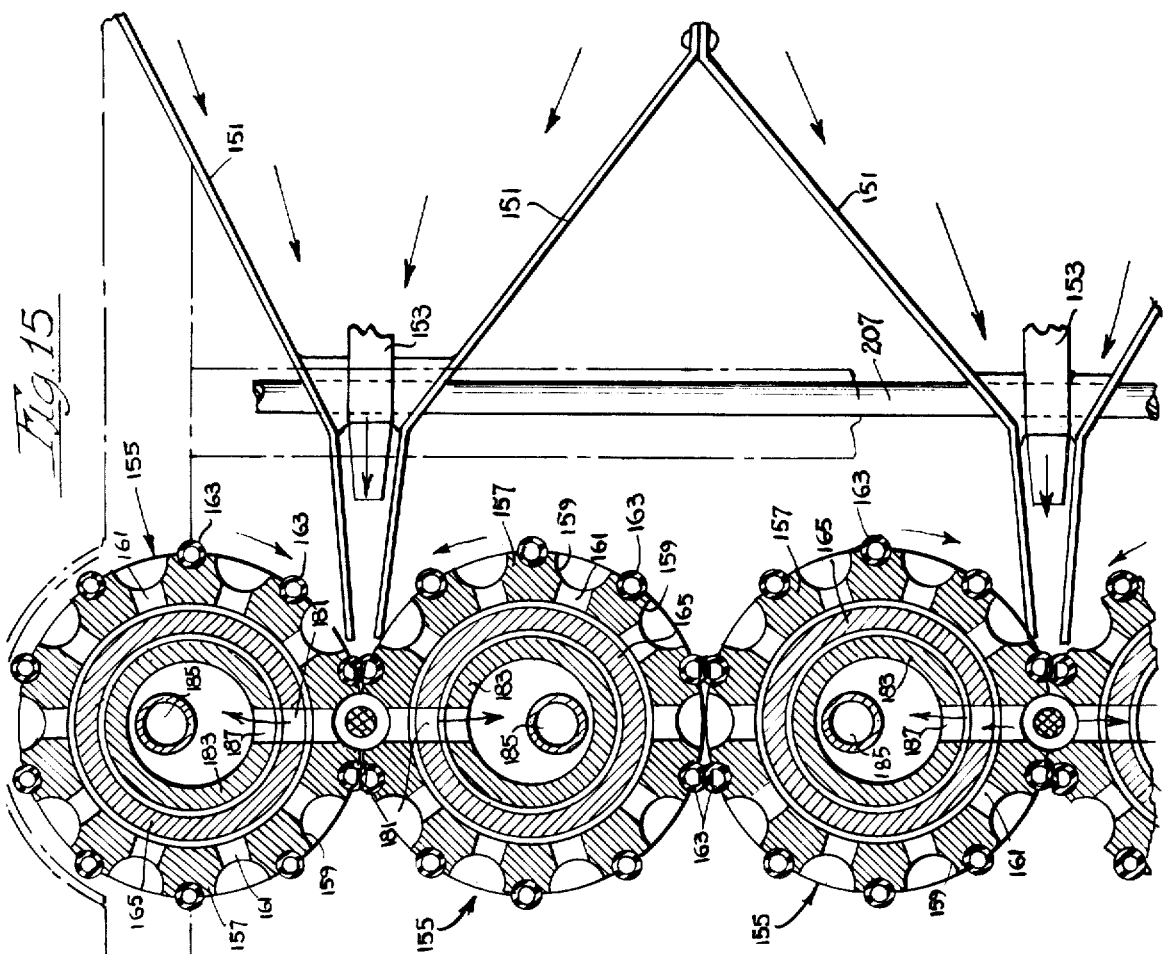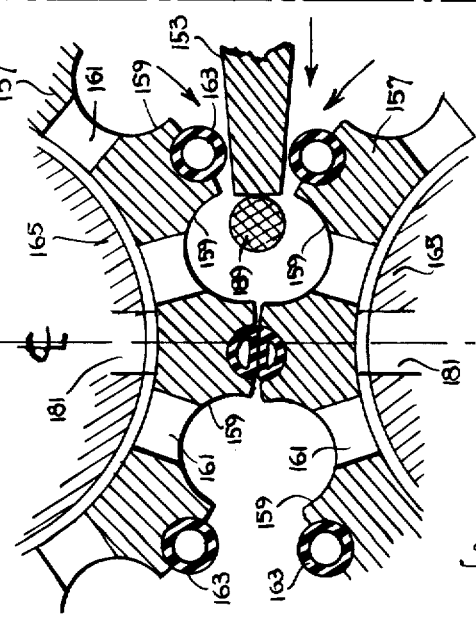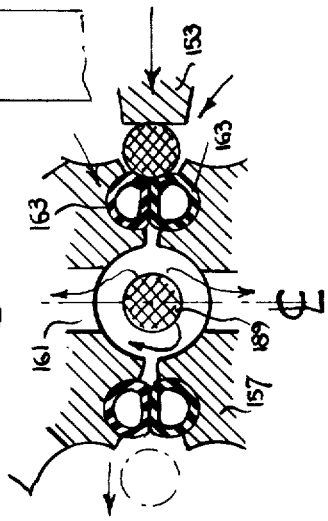

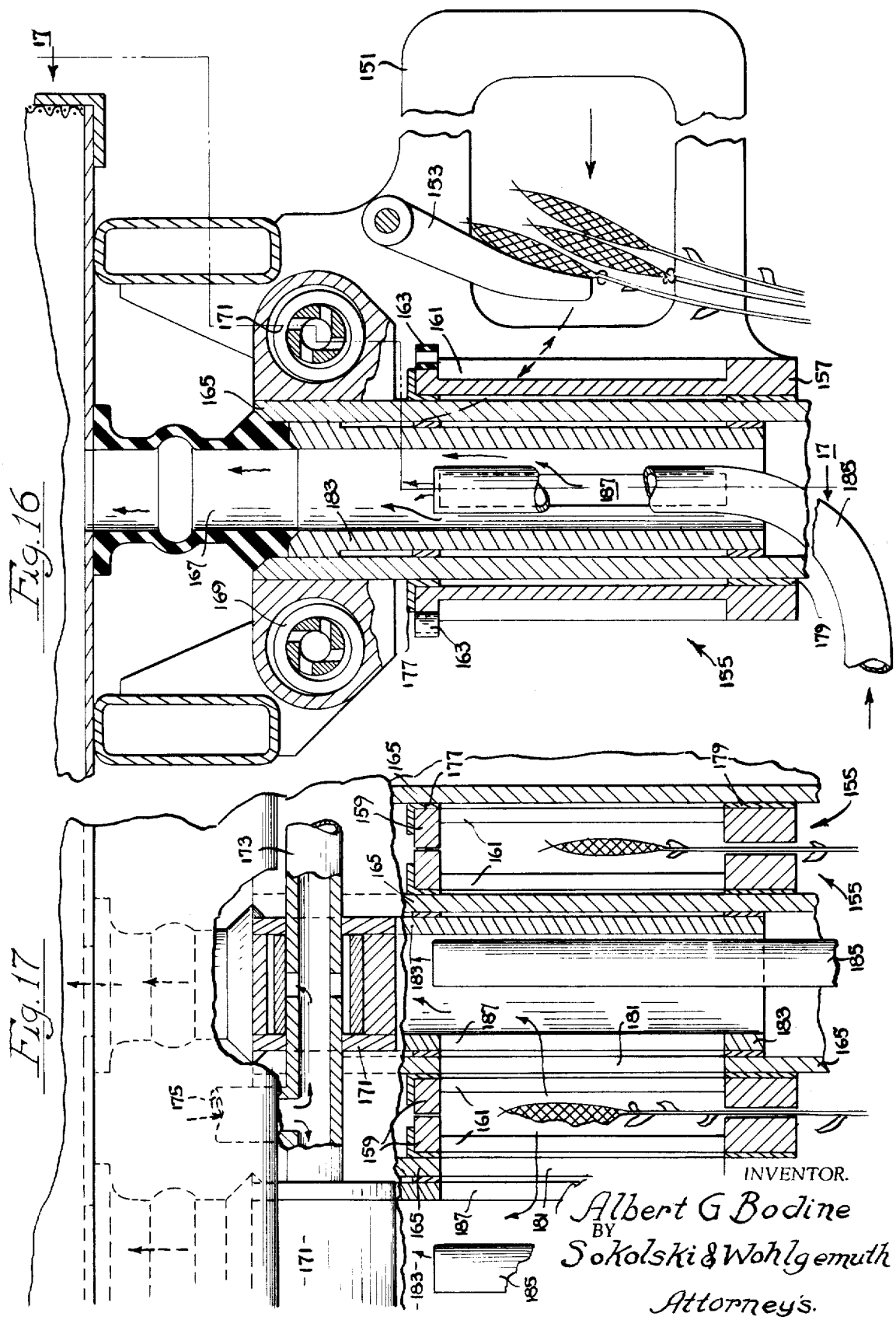

INVENTOR.
Albert G Bodine
BY
Sokolski & Wohlgemuth
Attorneys.

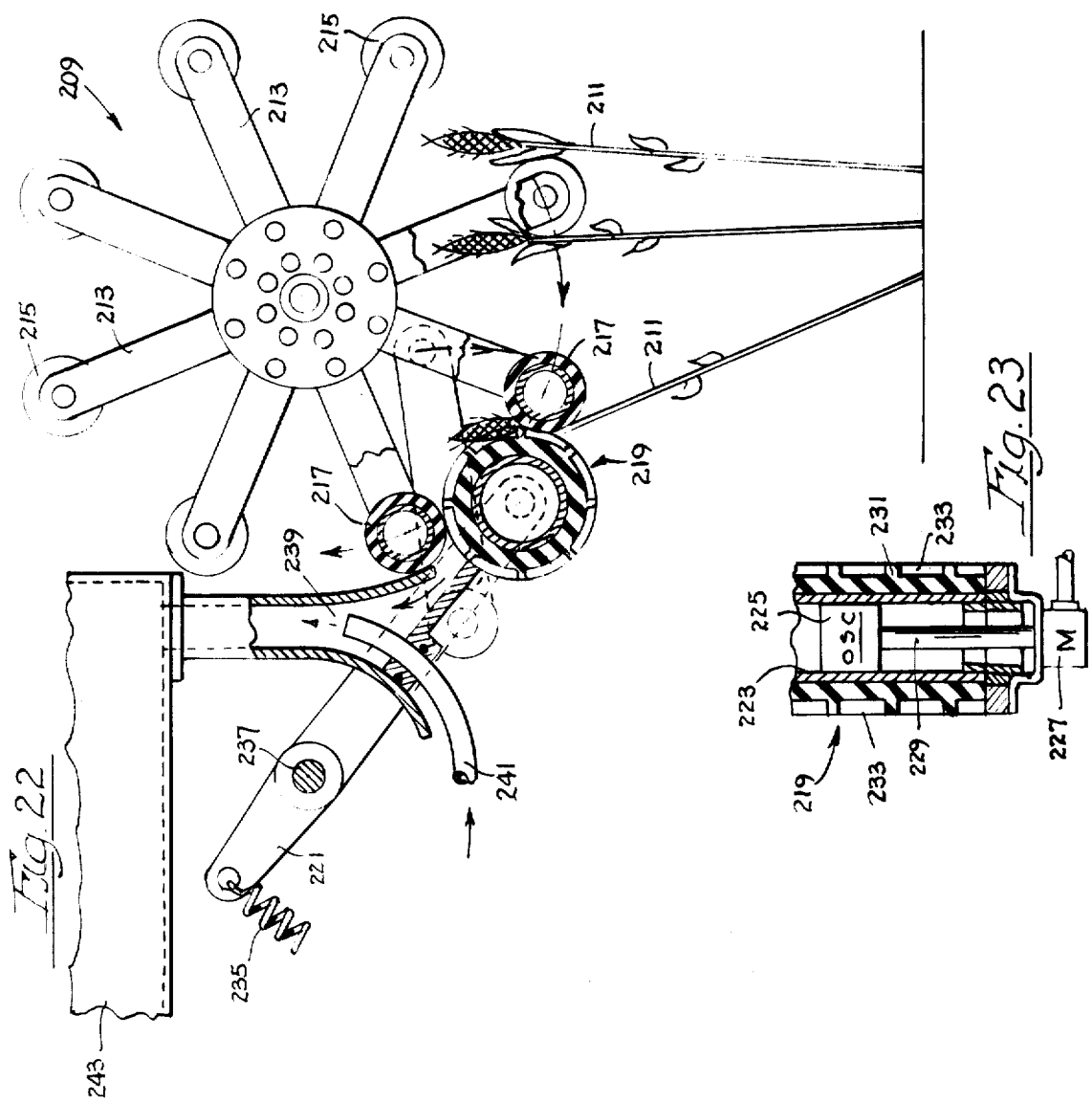

THRESHING DEVICE

One of the oldest and basic practices of man performing work has been in the threshing of crop elements such as grain. Thus, one of the most significant inventions and advances in the history of farming was the McCormack Reaper. The reaper worked on the principle of a large rotating wheel which forced the grain stalk against a cutting blade. The cut grain stalk was then transported back to a portion of the machine where it was subjected to a beating action. The beating served to knock the grain or wheat off of the straw. The combined separated straw and wheat grain was then transported to a separating region where the grain could fall through the straw. One of the main problems in the threshing operation is that large masses of straw has to be handled in order to thresh the grain. Further, the normal threshing operation wastes a substantial portion of the grain since it becomes trapped in the straw mass and is thrown away with it. As a result, threshers have been subsequently developed utilizing various complicated means for better separating the straw from the grain.

Thus it is an object of this invention to provide a device for improving the threshing of grain.

Another object of the invention is to provide a device for separating the grain from the stock or chaff without removing the chaff from the field.

Still another object of this invention is to improve the amount of reaped grain obtained from a threshing operation.

The above and other objects are accomplished by the device of this invention which is affixed to a tractor or other suitable implement for traversing grain fields. The invention is based upon utilizing sonic energy. The crop elements which may be grain, whether it be wheat, barley or the like, is actually threshed in situ. Resonant sonic energy is directed into the stems of the stalk, the region where the grain itself is attached. The sonic action works the grain loose from the stems of the stalk so that the grain can be extracted without removing the chaff. In other words, the stem stays attached to the ground and the grain is worked off of the top end. To accomplish the aforegoing, a plurality of vibratory means are provided for contacting individual grain clusters while affixed to the straw or stalk in the field. The vibratory means can, for example, be rubber rollers, a plurality of fixed channels or fingerlike passages, or the like. Adjacent to the vibratory means there may additionally be provided a channel where the grain being vibrated is subjected to a suctionlike force which serves to remove it from the straw while in a loosened state and draw it into a storage hopper. The resonant vibratory energy imparted to the grain will generally serve to sever it from the stalk, while the vacuum-type means serves to withdraw it and in some instances finalize the breaking of the grain from the straw. The vibratory means can be provided to accommodate different grain heights, since it is apparent that not all stalks are of an equal height. In the various embodiments of the invention, the vibratory force is finally applied to individual attached grains. Depending upon the width or size of the device, a plurality of individual grains can be subjected to the vibratory forces simultaneously and independently.

It is believed that the invention will be better understood from the following detailed description and drawings, in which:

FIG. 1 is a pictorial representation of a tractor utilizing a first embodiment of this invention;

FIG. 2 is a partially sectioned view of a first embodiment of the invention;

FIG. 2a is an illustration of the standing wave vibration pattern established in the first embodiment;

FIG. 3 is an enlarged sectional view of a portion of the device shown in FIG. 2;

FIG. 4 is taken along lines 4–4 of FIG. 3;

FIG. 5 is a sectional view of a modification of the device shown in FIGS. 2—4;

FIG. 6 is a pictorial representation of a second embodiment of this invention;

FIG. 7 is a view taken along lines 7–7 of FIG. 7;

FIG. 8 is an enlarged partially sectioned detailed view of a portion of the device shown in FIG. 7;

FIG. 8a is an illustration of the standing wave pattern set up in the device shown in FIG. 8;

FIG. 9 is a schematic view of the tractor and attached apparatus of an additional embodiment of this invention;

FIG. 10 is a partially sectioned top view taken along lines 10–10 of FIG. 9;

FIG. 11 is an enlarged partially sectioned view of the threshing portion of the device of FIG. 9;

FIG. 12 is a partially sectioned view taken along lines 12–12 of FIG. 11;

FIG. 13 is a sectioned view of a portion of the rotary threshing apparatus of the device of FIG. 11;

FIG. 14 is an enlarged sectional detailed view taken along line 14–14 of the means for driving the rotary device shown in FIG. 11;

FIG. 15 is a top sectional view of another embodiment of this invention;

FIG. 16 is an enlarged detailed sectional view of a portion of the device of FIG. 15;

FIG. 17 is a sectional view taken along lines 17–17 of FIG. 16;

FIG. 18 is an enlarged detailed view of a pair of rotating spools shown in FIG. 15;

FIG. 19 is a view of the device of FIG. 18 in a rotated position;

FIG. 22 is a partially sectioned schematic representation of a further embodiment of this invention; and FIG. 23 is an enlarged sectional view of the large roller of the embodiment of FIG. 22.

Figure 20:
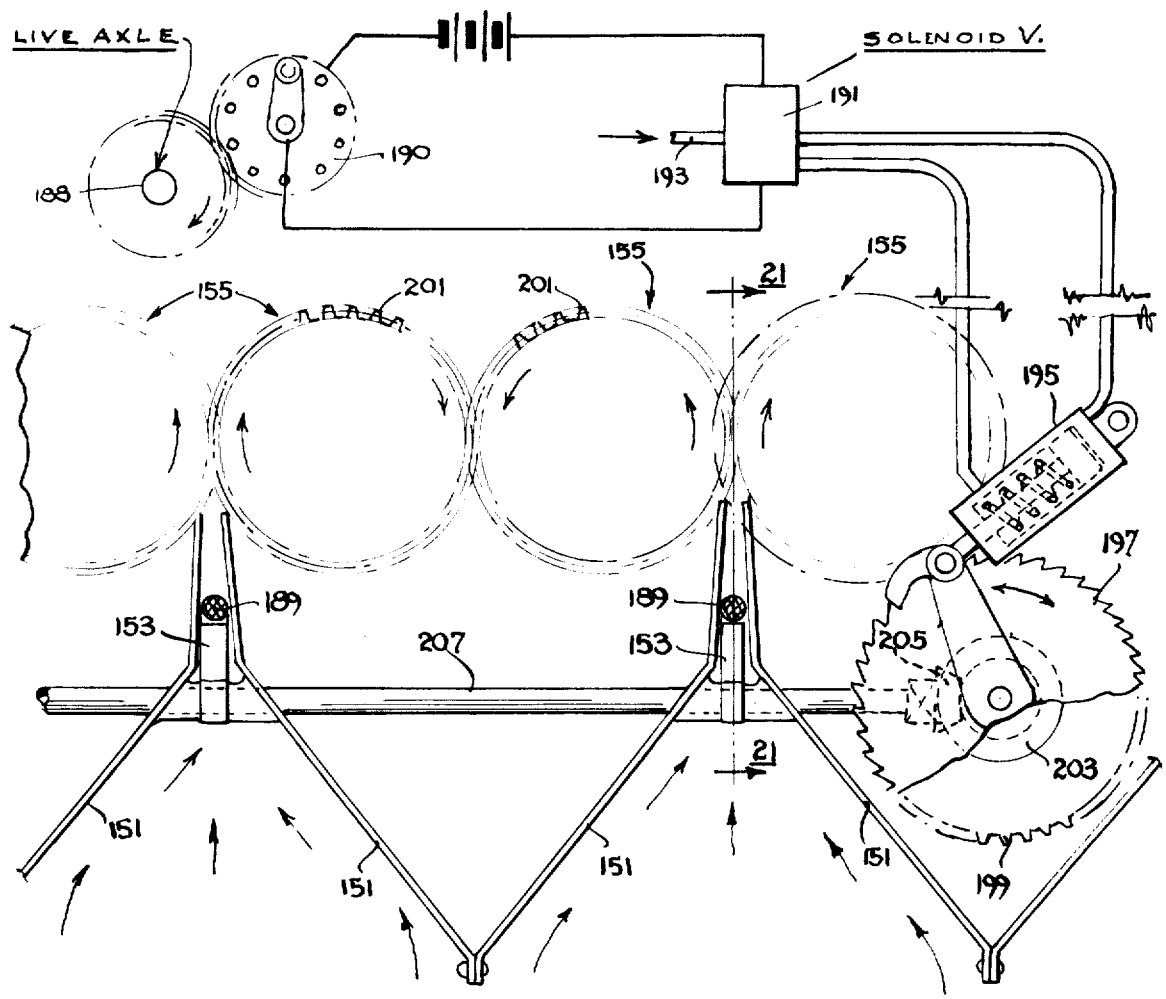
FIG. 20 is a schematic representation of the device of FIG. 17 showing a means for effectively operating the device.
Figure 21:
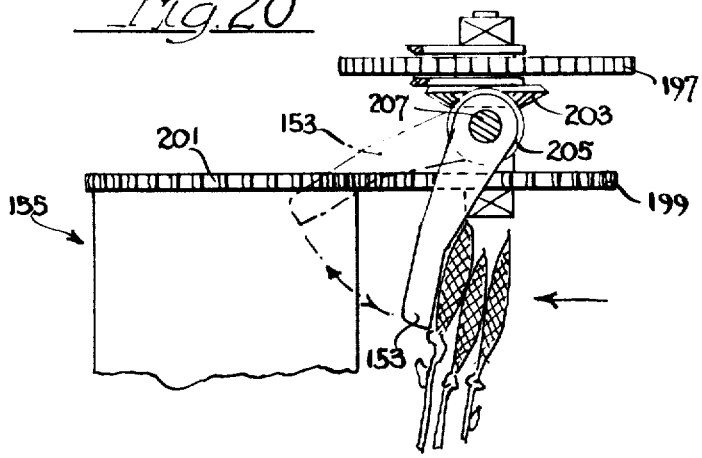
FIG. 21 is a sectional view taken along lines 21–21 of FIG. 20.

It has been found most helpful in analyzing the method of this invention to analogize the acoustically vibrating circuit utilized to an equivalent electrical circuit. This sort of approach to analysis is well known to those skilled in the art and is described, for example, in chapter 2 of "Sonics" by Hueter and Bolt, published in 1955 by John Wiley and Sons. In making such an analogy, force F is equated with electrical voltage E, velocity of vibrations $u$ is equated with electrical current $i$, mechanical compliance $C_m$ is equated with electrical capacitance $C_e$, mass $M$ is equated with electrical inductance L, mechanical resistance (friction) $R_m$ is equated with electrical resistance R and mechanical impedance $Z_m$ is equated with electrical impedance $Z_e$.

Thus, it can be shown that if a member is elastically vibrated by means of an acoustical sinusoidal force $F_o \sin \omega t$ ($\omega$ being equal to $2\pi$ times the frequency of vibration), that $$Z_m = R_m + j\left(\omega M - \frac{1}{\omega C_m}\right) = \frac{F_0 \sin \omega t}{u} \qquad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration $u$ is at a maximum, power factor is unity, and energy is more efficiently delivered to a load to which the resonant system may be coupled.

It is important to note the significance of the attainment acoustical "Q" in the resonant system being driven, to increase the efficiency of the vibration thereof and to provide a maximum amount of power for vibrating the elements that contact the grain. As for an equivalent electrical circuit, the "Q" of an acoustically vibrating circuit is defined as the sharpness of resonance thereof and is indicative of the ratio of the energy stored in each vibration cycle to the energy used in each such cycle. "Q" is mathematically equated to the ratio between $\omega M$ and $R_m$. Thus, the effective "Q" of the vibrating circuit can be maximized to make for highly efficient, high amplitude vibration by minimizing the effect of friction in the circuit and/or maximizing the effect of mass in such circuit.

In considering the significance of the parameters described in connection with equation (1), it should be kept in mind that the total effective resistance, mass, and compliance in the acoustically vibrating circuit are represented in the equation and that these parameters may be distributed throughout the system rather than being lumped in any one component or portion thereof.

It is also to be noted that orbiting mass oscillators are utilized in the implementation of the invention that automatically adjust their output frequency and phase to maintain resonance with changes in the characteristics of the load. Thus, in the face of changes in the effective mass and compliance presented by the load with changes in the conditions of the work material as it is sonically excited, the system automatically is maintained in optimum resonant operation by virtue of the "lock-in" characteristic of applicant's unique orbiting-mass oscillators. Furthermore, in this connection the orbiting-mass oscillator automatically changes not only its frequency but its phase angle and therefore its power factor with changes in the resistive impedance load, to assure optimum efficiency of operation at all times. The vibrational output from such orbiting-mass oscillators also tends to be constrained by the resonator to be generated along a controlled predetermined coherent path to provide maximum output along a desired axis.

Turning now to the figures, there is seen in FIG. 1 a vehicle 11 which has a hydraulic means 13 to raise and lower a structure 15 used to harvest or thresh the grain. Thus, for rapid transport over a highway the equipment 15 is raised to a fairly high level; and when operating in the field this level can be adjusted to meet the grain conditions. Where the grain is short, the operator merely adjusts the hydraulic cylinders 13 to lower the portion 15 to a lower level. The threshing mechanism 15 includes a plurality of collecting elements 17 which are connected to a sonic resonant generating system 19. An air line 21 serves to direct collected grain into a storage hopper 23. A rotating paddle-type wheel 24 serves to direct the grain into the collecting element 17.

Looking at FIGS. 2—5, it is seen that the collecting element 17 is comprised of a plurality of fingers 25 that move over the crest of grains confronting the moving machine. The fingers form identical passages or compartments 27 into which normally spaced plants moving inwardly are interrupted, so as to effect a single close file in-going formation from which delivery is regimented. As shown in FIG. 4, the fingers 25 can be in groups of three and held to a housing and support structure 29 affixed to frame 31 of the apparatus. Thus, the collection means 17 can comprise a plurality of such individual units of three fingers across the front of the machine as desired.

By collecting the grains as shown in a single file flow, there is thus provided an improved means for controlling the possibility of loss. The fingers 25 and support structure 29 are preferably comprised of a sheet metal construction. Each finger 25 is in fact a hollow body having slots 33 formed in the walls thereof. Line 21 carrying a flow of air is directed to the hollow finger elements 25. A separate line may be provided for each group of elements. The flow of air shown by the arrow creates a vacuum within the hollow fingers 25. The air acts as an aspirator and causes a reduction of pressure inside of the hollow fingers to effect the vacuum. Thus, the vacuum holds the grains against slots 33 or a single slot 37 shown in the embodiment of FIG. 5. While the grain is held against the walls of the finger, it is subjected to sonic resonant vibration.

Connected to a housing structure 29 is an orbiting mass oscillator 39 driven by a motor 41 through a shaft 43. The oscillator can be of the type illustrated, for example, in U.S. Pat. No. 3,217,551. Thus, the fingers 25 become an acoustic radiating surface. There thus results good impedance matching between the radiating surface of the finger 25 and the low impedance grain particles 35. This impedance matching feature is due to the fact that the sheet metal structure is thin walled, acting much like a whip wherein there is considerable amplitude in the low-impedance region.

Slots 33 act not only as a section means for holding the grain against the resonantly driven walls of the fingers, but also act as a conveying means whereby the vacuum created within the fingers pulls the grain into the structure 29. The jet of air blows the grain particles into a wire basket 23, provided adjacent the finger element. A separate basket 23 can be provided for each set of fingers, or alternatively an elongated basket across the entire front of the machine may be provided.

The wave pattern 45 shown in FIG. 2a illustrates the impedance matching characteristics of the structure. It is noted that the oscillator 39 is very near to a node 47 so that it can deliver its energy in a fairly high impedance form. On the other hand, a full quarter wave length 49 exists down in the region of the radiating structure of fingers 25. This then puts the grain in a region of fairly low impedance so that good matching is accomplished, as previously mentioned.

Another form of the invention is illustrated in FIGS. 6 – 8. The apparatus shown in these FIGS. can be utilized on a type of tractor device as shown in FIG. 1. An I-beam structure 51 can be affixed to a vehicle such as for example shown in FIG. 1, and serves to support the structure involved so that it can be applied to grain stalks as the vehicle progresses through the field. An oscillator 53 resonates an elastic bar 55 in a lateral wave mode as illustrated at the wave 57 shown in FIG. 8. The elastic bar 55 is mounted in a resilient bearing 59 mounted in rubber or other similar material in the region of a node for the bar 55. The oscillator is driven by a motor 61 to vibrate at a resonant frequency.

The elastic bar 55 terminates in an acoustic coupling roller 63 which can turn freely on the bar by way of a permanently oiled bushing 65. Thus, the roller 63 is free to rotate on the bar as the apparatus moves along the stalk of the plant. Concurrently, the rotary movement of the roller does not in any way hinder the transmission of resonant sonic energy from the bar 55, since the bushing has only a sliding fit to permit the turning. In other words, the radial forces are transmitted through the bearing 65 so that the outer surface of the roller 53 vibrates in response to a resonant wave motion shown at the lower portion of the wave 57. As particularly shown in FIG. 7, a plurality of the rollers 63 are utilized and spaced apart from each other a distance equal to a grain 67, so that the grain can pass between the rollers and be subjected to vibratory energy. The resonant motion of the rollers as they pass along the stalk of the plants shakes the grain loose so as to fall into a hopper 69, also connected to the I-beam structure 51.

It should be understood that although only three rollers are shown in FIG. 7 by way of example, due to the grain size actually many such rollers are utilized across the front of the device while serving to remove the grain. As can be noted, the rollers progress through the grain on an inclined axis so that the grain stalks become trapped between a pair of rollers similar to a laundry wringer. In other words, the rollers when held at inclined axis and transported through the grain will result in the grain actually continually being drawn through the rollers. This enables the sonic energy to be continually applied through the rollers and to the attachment region of the grain. It is to be noted that when the roller is down on the main part of the stem 71, there is not much action occurring in the region of the plant since the stem is very well adapted to take the sonic energy without much effect. However, as the roller rolls along the plant it moves out toward the region where the grain 67 is attached. At this point the stem provides a termination of an acoustic line. In other words, the plant behaves like an acoustic line and the resonant sonic energy is transmitted on out the stem of the plant from the roller. When the energy reaches the region of the grain itself, there is a termination having a large reflection. At this reflection region where the grain is fastened to the plant there is a considerable concentration of sonic energy. This results in the grain being quickly detached. Of course, this effect is greatly enhanced as the roller gets closer and closer to the grain attached. In some instances the grain begins to fall off as the roller approaches it, while the tighter grains fall off only when the roller actually contacts the grain.

Turning now to FIGS. 9—14, there is seen a further embodiment of this invention. As seen in FIG. 9, there is mounted on a vehicle 73, a swingable boom 75 that places a collecting device 77 over the crest of grains confronting the forwardly moving machine. A plurality of V-shaped chambers 79 and 81 gather tall and short varieties of plants. The chambers are formed from intermediate solid plates 83 to which are attached either high or low tracks depending upon the compartments. Thus, compartments 79 represent the ones disposed at the lower portion of the machine, while compartments 81 are disposed upwardly from compartments 79. The lower compartments are formed by lower deflector plates 85 affixed to the intermediate plates 83 and outer sideplates 87. The upper compartments are formed from plates 89 that are directed thereto at a corresponding level. Small intermediate plates 91 extend between the chambers 79—81 and intermediate plates 83 to further form the desired compartments. Thus it can be seen that the main purpose is to provide a plurality of adjacent compartments at two different levels.

Disposed in each compartment at the junction of the respective divergent plates are located rotating spools 92 and 93 respectively for the lower and upper compartments. The rotating spools serve to further direct the wheat to a source of vibratory energy and eventually remove the grain.

As seen in FIGS. 13 and 14 particularly, each spool comprises two circular spaced-apart plates or discs 94 and 95 respectively. Each disc is formed with a center axle 97 and 99. The discs are spaced from each other by three spacer elements 101, which further serve as stops as will be explained. The axles extend outwardly from the plates through hubs 103 provided in plates 89 and 91. Rotarily mounted on hubs 103 are support structures 105 comprised of three spaced-apart arms 107. Pivotally connected on pins 111 to the outer end of the arms 107 are pickup fingers 113 which have an outer rubber surface 115. The fingers 113 are additionally affixed to the spool by pins 112 which serve as a pivot point for the movement of the fingers. The pins 111 can move within slots 116 provided in the discs. Since pins 111 extend through discs 94 and 95, the arms will move together with rotation of the discs rotating on bushing 117. The axle 99 located through the center of the discs 94 and 95 is eccentrically disposed relative to the radiating arms 107. This is effected by the forming the hub 103 to be eccentric about the axle 99.

The driving means for the spools can be taken from the prime mover vehicle as shown in FIGS. 11 and 14. A main drive axle 123 is thus rotated causing associated gears 125 to be operated. Main drive gears 125 in turn cause rotation of associated gears 127 which are fixed to the axle 99, rotating the discs 93, 94 and the respective fingers in a clockwise direction as seen in FIG. 11. As seen in FIGS. 11 and 13 this effectuates the rotation of the upper spools 93. The lower spools 92 are rotated in a like manner by a drive taken off an output gear 129 through a chain drive or other similar connection 131. Thus, it can be seen from FIG. 13 that as the spool is rotated in a clockwise direction, the fingers 113 will project outwardly as at the top position of the spool, and with the pin 111 located at the outer extremity of the slot 116 the rubber surface 115 is thus in the position to grip the grain 133 and bring the plant to the backside of the spool through the action of the stops 101 pushing on the plant.

Thus, as can be seen, the fingers continually pivot about pins 112 and move within the slot 116 as the spools are rotated. The grain 133 is thus brought back against a chamber 135. The chamber 135 is connected to a manifold 137 as seen particularly in FIGS. 11 and 12 through which air is directed. The force of the air acts as an aspirator much in the same manner as disclosed in the embodiment shown in FIGS. 1—4, to draw the wheat into a storage hopper or basket 139. As can be seen, a separate chamber 135 is provided for each adjacent pair of upper and lower spools 93 and 92 respectively, each chamber connecting with a manifold 137 for inlet air, and an upper manifold 141 to direct and carry the removed grain to the storage hopper 139, as seen in FIG. 11.

When the grain 133 is against the chamber 135, it is subjected to high energy vibrations which are applied to shake loose the grain so that it can be readily withdrawn by the air suction. To accomplish this, an elastic metal bar 143, as shown in FIGS. 11—12, is connected at its lower end to each chamber 135. Each elastic bar, in turn, at its upper portion contains an orbiting mass oscillator 145 to generate sonic resonant vibration in the elastic member. The orbiting mass oscillator 145 can be air driven through a manifold 147 which can be connected to all of the oscillators provided. The foregoing results in establishing a resonant standing wave in elastic member 143 to cause vibration within the chamber 135 at the point where the grain comes in initial contact therewith.

Turning now to FIGS. 15—21, there is seen a further embodiment of the invention. As seen in FIG. 15, this embodiment utilizes a plurality of V-shaped channels 151 into which the normally spaced plants moving inwardly are interrupted at the exit so as to effect a closed single file in-going formation. The device can be attached to an apparatus such as for example shown in FIG. 9. The incoming plants are directed to metering arms 153, particularly seen in FIG. 16 at the junction of the V-shaped compartments. The metering arms act to deliver the plants individually and intermittently to a plurality of hollow resonating spools 155 which serve to remove the grain particles. The spools 155 are comprised of an outer rotating cylinder 157. The cylinders 157 are scalloped on their outer periphery with a plurality of semicircular indentations 159. Vertical slots 161 are provided within each scalloped area. On the outer periphery of the spools are located compressible elastomeric pieces 163 located between each scalloped portion. The elastomeric pieces 163 can, for example, take the form of tubular members, as shown in the drawings.

Concentrically disposed within the outer cylinder 155 is a second intermediate cylinder 165. Cylinder 165 is rigidly affixed to a channel 167 as seen in FIG. 17 that is in turn affixed to the housing for the overall device. This intermediate cylinder 165 is additionally connected to two orbiting mass oscillators 169 and 171 disposed on opposite sides of the cylinder at the upper end thereof.

As seen in FIG. 17, a manifold 173 carries air or other gas pressure from inlet line 175 to the orbiting mass oscillators. This in effect thus effectively causes a resonant sonic vibration to occur in cylinder 165. Outer cylinder 155 is separated by upper and lower bushings 177 and 179 respectively from the inner cylinder 165 to allow rotation thereon. Cylinder 165 is further provided with a slot 181 which is permanently fixed in a direction normal to the incoming grain as seen in FIG. 16. Finally, there is an innermost cylinder 183 which is spaced from cylinder 165. Cylinder 183 has an inlet line 185 directed thereto which carries air upward through the passage 167 at the uppermost end of the device. This creates a vacuum within cylinder 183 in the manner similar to that described in the aforegoing embodiments. Cylinder 183 also has a slot 187 which is permanently coaligned with slot 181 in the intermediate cylinder 165.

Thus, as seen in FIGS. 18 and 19, as the outer cylinders 157 rotate in the direction shown by the arrows, they enclose a single grain 189 fed by arm 153 between adjacent scalloped portions 159. The arm will retract after the grain is so fed as seen in FIG. 18, and the elastomeric material forms an enclosed seal about the grain as seen in FIG. 19, allowing the aspiration effect through the slot 181 of the intermediate cylinder to pass through the slot 161 and withdraw the grain. Concurrently with this, however, the individual grain 189 will contact a portion of the walls of the outer cylinder which are resonantly vibrating due to the vibrations imparted to the intermediate cylinder 165 and being transmitted through the bushings 177 and 179 to the outer cylinder, serving to loosen the grain. In other words, though as seen in FIG. 19 the grain is perfectly centered between adjacent spools, in effect the grain actually contacts the walls of the outer cylinders involved before it is removed and aspirated into a storage container through passage 167.

As can be appreciated, the timing for the arm 153 in cooperation with the rate of rotation of the outer cylinders 155 of the spools is important to ensure the grain being fed in the manner shown in FIGS. 18 and 19. It is apparent that the rate of feeding of the grain and the rate of rotation of the spools should be tied to the forward speed of the vehicle utilized. Thus, as seen in FIG. 20, the live axle 188 of the vehicle, a metering wheel 190 is geared to the live axle for transmitting in a make and break sequence impulses to a solenoid valve 191. The solenoid valve 191 in turn regulates the flow of air pressure from line 193 to a cylinder 195. Automatic reciprocations in cylinder 195 cause a ratchet rotation of a wheel 197 in a counter clockwise direction. Integral with the wheel 197 is a gear 199 meshed in the first gear 210 of a train of interengaging gears across the entire machine.

The gears 201 which are integral with the spools are rotated in steps and arranged in pairs, one pair for each compartment so as to put these pairs where each pair cooperates with a line of incoming plants to the spools. Each pair therefore is turned in a direction to cause the entrance and exit of the plants toward the rear of the machine. Coordinated with these actions is still another action which controls the swingable metering arm 153 which must be swung in timed relation and in step with the measured steps of the spools. The arm 153 is therefore actuated by a bevel gear involvement between bevel gears 203 and 205. A rock shaft 207 is connected to bevel gear 205 with the metering arms 153 mounted and swingable thereon. It can thus be seen that the device of the invention is capable of taking plants from high and low levels in an involvement that permits individualized processing and reduces the possibility of loss to a minimum.

The final embodiment schematically shown in FIGS. 22-23 uses a rotating drum or paddle wheel similar to the basic McCormack reaper. However, the difference is that the paddle wheel 209 is merely used to bring the grain into a good position where it can be brought into firm contact with the sonic driver source. This form of machine utilizing a rotating paddle as schematically shown in the figures is especially effective where the grain has been caused to fall down closer to the ground as a result of winds and rains before harvesting. However, the basic sonic action is identical with the previously described concepts. As seen, the arms 213 of the wheel have rollers 215 mounted on the outer extremities thereof. The rollers are preferably covered with an elastomeric material 217 such as rubber or the like, and serve to direct the wheat to a larger roller 219. The roller 219 is sonically vibrated and is carried at the end of a spring pressed arm 221. As seen in FIG. 23, the roller 219 comprises an inner cylinder 223 having an orbiting mass oscillator 225 mounted therein. The oscillator is driven by motor 227 acting through shaft 229. Roller 219 in turn is covered with a soft rubber casing 231, having a plurality of pockets 233 therein. The pockets are provided so that the grain particles can collect on the roller while it passes.

Thus, the rollers 215 being individual plants 211 up to a focal point stripping against the large roller 219 to cause an impingement of the planthead between the large roller 219 and the individual roller 215, as the large roller 219 is successively engaged and depressed by the succession of smaller rollers 215. The arm of the large roller 219 is swingable in opposition to spring 235 about a pivot shaft 237 when the rollers 215 successively pass over the main roller 219. The grain particles are thus dislodged by the vibration of roller 219 and are transported by rotation of the wheel into a compartment 239.

Compressed air blown through line 241 aspirates the grain particles into a storage bin 243 in a manner previously described.

I claim:

1. A harvester device for threshing crop elements from the stock while the stock remains rooted to the ground, comprising:
   elastically vibratory means having a plurality of spaced vibratory coupling means for engaging said crop elements and stock, said coupling means providing an impedance for energy transmission to said crop elements and stock, and
   sonic oscillator means affixed to said device and coupled to said vibratory means for subjecting the engaged stock and crop elements to resonant sonic vibration whereby said crop elements growing on said stock are detached therefrom,
   said oscillator means being operated at a resonant vibration frequency of said vibratory means.

2. The device of claim 1 further comprising:
   means for storing said removed crop elements.

3. The device of claim 2 further comprising:
   means for carrying the removed crop elements from said engaging means to said storage means.

4. The device of claim 3 wherein said carrying means comprises a channel having an airstream passing therethrough to direct the crop elements to said storage means.

5. The device of claim 4 wherein said channel is integrally formed with said means for engaging the crop elements, said engaging means provided with openings communicating with said channel whereby said crop elements are subjected to a vacuum suction force when in contact with said openings to pull said crop elements through the openings into the channel.

6. The device of claim 1 wherein said sonic oscillator means comprises at least one orbiting mass oscillator.

7. The device of claim 1 wherein said means for engaging said crop elements is of elastomeric material acoustically coupled to a resonant vibration system.

8. The device of claim 1 wherein said means for engaging said crop elements is located in a low impedance region of a standing wave of the vibratory pattern.

9. A harvester device for threshing crop elements from the stock while the stock remains rooted to the ground comprising:
   means for storing the removed crop elements,
   elastically vibrating means having means for engaging said crop elements and stock including adjacent rotatable spools separated from each other by at least an individual crop element particle whereby said spools can contact and direct said crop elements to said storage means, and
   sonic oscillator means affixed to said device and coupled to said vibratory means for subjecting the engaged stock and crop elements to resonant sonic vibration whereby said crop elements growing on said stock are detached therefrom,
   said oscillator means being operated at a resonant vibration frequency of said vibratory means.

10. The device of claim 9 wherein said spools are covered with an elastomeric material capable of gripping said crop elements.

11. The device of claim 9 further comprising:
    channels disposed in front of said spools for directing individual crop elements between said spools.